United States Patent [19]

Tada

[11] Patent Number: 5,764,678
[45] Date of Patent: Jun. 9, 1998

[54] WAVELENGTH-STABILIZED NARROW BAND EXCIMER LASER

[75] Inventor: Akifumi Tada, Tokyo, Japan

[73] Assignee: NEC Corporation, Tokyo, Japan

[21] Appl. No.: 761,835

[22] Filed: Dec. 9, 1996

[30] Foreign Application Priority Data

Dec. 8, 1995 [JP] Japan ................... 7-345877
Feb. 28, 1996 [JP] Japan ................... 8-040219

[51] Int. Cl.[6] ................................................ H01S 3/22
[52] U.S. Cl. .............................. 372/57; 372/23; 372/55; 372/61; 372/65; 372/107
[58] Field of Search ............................ 372/9, 14, 16, 372/23, 25, 29, 32, 55, 57, 61, 65, 99, 100, 107, 108

[56] References Cited

U.S. PATENT DOCUMENTS

| | | | |
|---|---|---|---|
| 4,213,100 | 7/1980 | Keijser et al. ............... | 372/61 X |
| 4,352,185 | 9/1982 | Crane ............................ | 372/29 |
| 4,769,824 | 9/1988 | Seki ............................. | 372/107 |
| 4,829,536 | 5/1989 | Kajiyama et al. ............. | 372/57 |
| 5,091,914 | 2/1992 | Maeda et al. ................. | 372/61 |
| 5,142,543 | 8/1992 | Wakabayashi et al. ....... | 372/32 |
| 5,150,370 | 9/1992 | Furuya et al. ................ | 372/106 |
| 5,596,596 | 1/1997 | Wakabayashi et al. ....... | 372/102 |
| 5,617,440 | 4/1997 | Meier ............................ | 372/61 |
| 5,642,374 | 6/1997 | Wakabayashi et al. ....... | 372/57 |

Primary Examiner—Brian Healy
Attorney, Agent, or Firm—Sughrue, Mion, Zinn, Macpeak & Seas, PLLC

[57] ABSTRACT

The present invention provides a wavelength-stabilized narrow band excimer laser device which has a discharge tube, a cavity formed of both an output mirror at a front side and a total reflection mirror at a rear side, and a wavelength selective element positioned between the front and rear mirrors, wherein the output mirror, the total reflection mirror and the wavelength selective element are securely fixed on a supporting structure which is mounted via a vibration removing device over a mount on which the discharge tube is mounted so that the output mirror, the total reflection mirror and the wavelength selective element are free from any vibration of the discharge tube. The wavelength selective element comprises at least a prism and at least an etalon wherein the above novel wavelength-stabilized narrow band excimer laser device may further have at least a beam splitter for causing a laser beam sprite, a spectroscope for measuring a center wavelength of the split laser beam, a beam-position detector for measuring a direction of the laser emission, a first driver for adjusting a laser beam transmission angle of the etalon, a second driver for adjusting an angle of the total reflection mirror, and a controller for controlling both the first driver in accordance with variations in the center wavelength of the laser beam measured by the spectroscope and the second driver in accordance with variations in the direction of the laser emission measured by the beam-position detector.

13 Claims, 10 Drawing Sheets

Normal

Wavelength Variation of Etalon

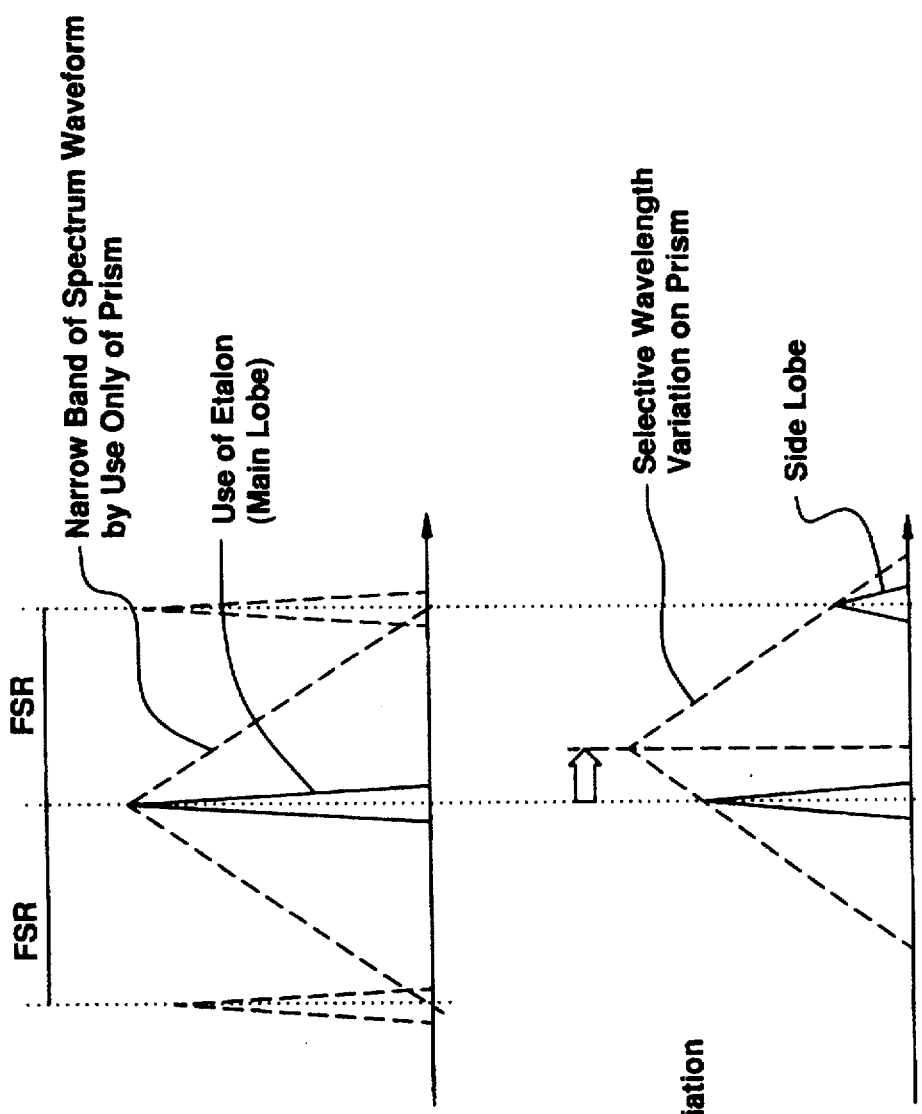

WAVELENGTH-STABILIZED NARROW BAND EXCIMER LASER

BACKGROUND OF THE INVENTION

The present invention relates to a wavelength-stabilized narrow band excimer laser device.

One of the conventional wavelength-stabilized narrow band excimer laser devices is disclosed in the Japanese laid-open patent publication No. 2-110985. The conventional wavelength-stabilized narrow band excimer laser device has an optical resonator with front and rear mirrors. In the optical resonator, a wavelength selective element is provided for selecting a wavelength of the laser beam to be emitted. The wavelength of the laser beam is adjusted to obtain a stabilization of the wavelength and spectrum of the laser beam. The conventional wavelength-stabilized narrow band excimer laser device further has an optical axis compensation device which is capable of recovery of an output laser power and concurrent compensation of the optical axis of the output laser beam automatically and accurately by a simple operation in a short time.

FIG. 1 is a schematic view illustrative of the structure of the above conventional wavelength-stabilized narrow band excimer laser device. The conventional wavelength-stabilized narrow band excimer laser device has a discharge tube 1 in which a laser gas is sealed. A total reflection mirror 4 is provided on an optical axis of the discharge tube 1 at an input side of the discharge tube 1. The total reflection mirror 4 is distanced from the discharge tube 1. Two pairs of etalons 21 and 22 as wavelength selecting elements for narrow band are provided on the optical axis of the discharge tube 1. The etalons 21 and 22 are positioned between the total reflection mirror 4 and the discharge tube 1. An output mirror 7 is provided on the optical axis of the discharge tube 1 at an output side of the discharge tube 1. The output mirror 7 is distanced from the discharge tube 1. A first partial reflection mirror 8 is provided on the optical axis of the discharge tube 1 at the output side of the discharge tube 1. The first partial reflection mirror 8 is distanced from the discharge tube 1 so that the output mirror 7 is positioned between the first partial reflection mirror 8 and the discharge tube 1. The first partial reflection mirror 8 is arranged so that a mirror ace has an angle of 45 degrees with reference to the optical axis of the discharge tube 1. A second partial reflection mirror 9 is provided on a vertical axis to the optical axis of the discharge tube 1 wherein the vertical axis across at the right angle to the optical axis at a position where the first partial reflection mirror 8 is provided so that the second partial reflection mirror 9 receives a partially reflected laser beam transmitted on the vertical axis from the first partial reflection mirror 8. The second partial reflection mirror 9 is also arranged so that a mirror face has an angle of 45 degrees with reference to the vertical axis. A third partial reflection mirror 10 is provided on the vertical axis so that the third partial reflection mirror 10 is distanced from the second partial reflection mirror 9. The second partial reflection mirror 9 is positioned between the first and third partial reflection mirrors 8 and 10. The third partial reflection mirror 10 is also arranged so that a mirror face has an angle of 45 degrees with reference to the vertical axis. An output detector 23 is provided on the vertical axis and distanced from the third partial reflection mirror 10. A spectroscope 11 is further provided on a first parallel axis to the optical axis wherein the first parallel axis across at the right angle to the vertical axis at a position where the second partial reflection mirror 9 is provided. The spectroscope 11 is distanced from the second partial reflection mirror 9 so that the spectroscope 11 receives a partially reflected laser beam having been transmitted on the first parallel axis from the second partial reflection mirror 9. A position detector 12 is further provided on a second parallel axis to the optical axis wherein the second parallel axis across at the right angle to the vertical axis at a position where the third partial reflection mirror 10 is provided The position detector 12 is distanced from the third partial reflection mirror 10 so that the position detector 12 receives a partially reflected laser beam having been transmitted on the second parallel axis from the third partial reflection mirror 10. A central processing unit 13 is further provided, which is electrically connected to the spectroscope 11, the position detector 12 and the output detector 23 for obtaining informations of the output laser beam so that the central processing unit 13 controls the total reflection mirror 4, the output mirror 7, and the etalons 21 and 22.

The laser beam is emitted from the discharge tube 1 and transmitted via the output mirror 7 to the first partial reflection mirror 8 which comprises a beam splitter where the laser beam sprite appears and part of the laser beam remains transmitted straight whilst the remaining part of the laser beam is reflected by the second partial reflection mirror 9 and then transmitted on the first parallel axis to the spectroscope 11 whereby the emission central wavelength and the central wavelength power are detected. The central processing unit 13 fetches informations about the output laser beam such as the emission central wavelength and the central wavelength power from the spectroscope 11 to adjust the attitude angle, temperatures and pressures of the etalons 21 and 22 so as to control the wavelength of the laser beam for obtaining the maximum intensity of the laser beam at the central wavelength and a fixed emission wavelength. The laser beam having been transmitted through the two pairs of the etalons 21 and 22 have only the wavelength composition which satisfy both conditions of the etalons 21 and 22 superimposed for a single mode wavelength laser emission and a high output power of the laser beam.

The above conventional excimer laser device is designed to observe the output laser beam via the spectroscope 11, the potion detector 12 and the output detector 23 and if any variation appears on the laser beam output, then the excimer laser device is operated to adjust the output mirror 7, the total reflection mirror 4 and the etalons 21 and 22 in the complicated manners.

The above conventional excimer laser device has the following problems. Vibration of a gas circulation fun of the discharge tube and an atmospheric condition of the laser device causes variation in attitude of the device whereby a wavelength variation and an optical axis shift appear. In order to control the attitude of the device, it is necessary for the conventional laser device to provide the spectroscope 11, the potion detector 12 and the output detector 23 and adjust the output mirror 7, the total reflection mirror 4 and the etalons 21 and 22 in the complicated conditions relative to each other, for which reason the control operation is very complicated.

SUMMARY OF THE INVENTION

Accordingly, it is an object of the present invention to provide a novel wavelength-stabilized narrow band excimer laser device adopted for facilitation of the wavelength stabilization and free of any optical axis shift.

The above and other objects, features and advantages of the present invention will be apparent from the following descriptions.

The present invention provides a wavelength-stabilized narrow band excimer laser device which has a discharge tube, a cavity formed of both an output mirror at a front side and a total reflection mirror at a rear side, and a wavelength selective element positioned between the front and rear mirrors, wherein the output mirror, the total reflection mirror and the wavelength selective element are securely fixed on a supporting structure which is mounted via a vibration removing device over a mount on which the discharge tube is mounted so that the output mirror, the total reflection mirror and the wavelength selective element are free from any vibration of the discharge tube. The wavelength selective element comprises at least a prism and at least an etalon wherein the above novel wavelength-stabilized narrow band excimer laser device may further have at least a beam splitter for causing a laser beam sprite, a spectroscope for measuring a center wavelength of the split laser beam, a beam-position detector for measuring a direction of the laser emission, a first driver for adjusting a laser beam transmission angle of the etalon, a second driver for adjusting an angle of the total reflection mirror, and a controller for controlling both the first driver in accordance with variations in the center wavelength of the laser beam measured by the spectroscope and the second driver in accordance with variations in the direction of the laser emission measured by the beam-position detector.

BRIEF DESCRIPTIONS OF THE DRAWINGS

Preferred embodiment according to the present invention will be described with reference to the accompanying drawings.

FIG. 10 is a view illustrative of a spectrum waveform shift due to variation of the wavelength selected by the etalon.

DISCLOSURE OF THE INVENTION

Figure 1:
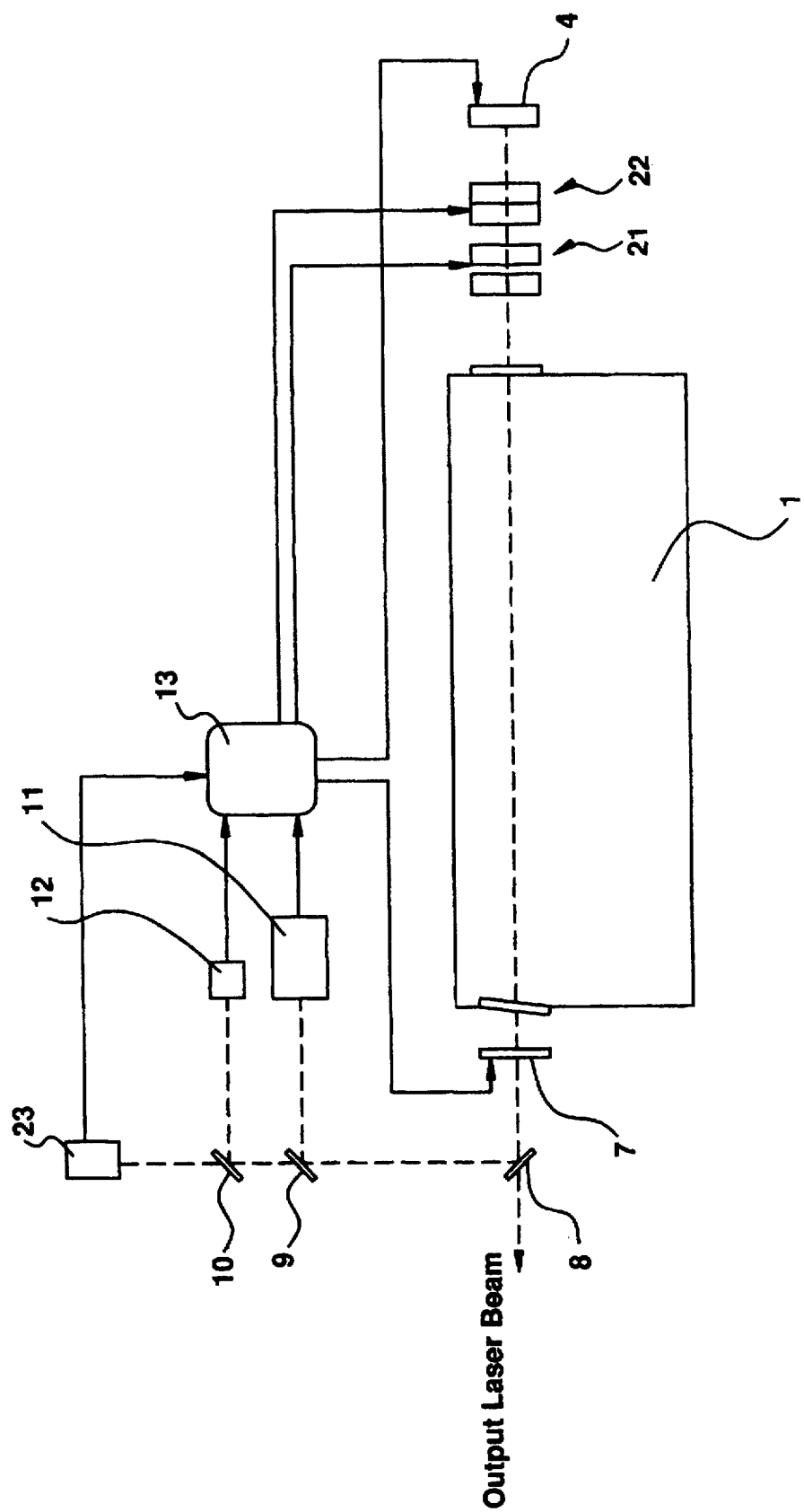
FIG. 1 is a schematic view illustrative of the conventional wavelength-stabilized narrow band excimer laser device.

The present invention provides a wavelength-stabilized narrow band excimer laser device which has a discharge tube, a cavity formed of both an output mirror at a front side and a total reflection mirror at a rear side, and a wavelength selective element positioned between the front and rear mirrors, wherein the output mirror, the total reflection mirror and the wavelength selective element are securely fixed on a supporting structure which is mounted via a vibration removing device over a mount on which the discharge tube is mounted so that the output mirror, the total reflection mirror and the wavelength selective element are free from any vibration of the discharge tube.

As described above, the output mirror, the total reflection mirror and the wavelength selective element are securely fixed on a supporting structure which is mounted via a vibration removing device over a mount on which the discharge tube is mounted so that the output mirror, the total reflection mirror and the wavelength selective element are free from any vibration of the discharge tube, for which reason the above novel excimer laser device is free from any variation in wavelength of the output laser beam, and a reduction in output of the laser beam as well as variation in direction of the laser emission.

The wavelength selective element comprises at least a prism and at least an etalon wherein the above novel wavelength-stabilized narrow band excimer laser device may further have at least a beam splitter for causing a laser beam sprite, a spectroscope for measuring a center wavelength of the split laser beam, a beam-position detector for measuring a direction of the laser emission, a first driver for adjusting a laser beam transmission angle of the etalon, a second driver for adjusting an angle of the total reflection mirror, and a controller for controlling both the first driver in accordance with variations in the center wavelength of the laser beam measured by the spectroscope and the second driver in accordance with variations in the direction of the laser emission measured by the beam-position detector.

If the atmosphere surrounding the excimer laser device is changed, the selective wavelength is changed due to a fine variation of the refractive index of the etalon and the refractive variation also appears on the prism whereby the direction of the laser beam of the wavelength selected by the etalon and the total reflection mirror. The controller controls the first driver to adjust the angle of the etalon for recovery of the variation of the wavelength into the allowed range and the second driver to adjust the angle of the total reflection mirror for recovery of the variation in the direction of the laser emission into the allowed range so that the wavelength variation and the optical axis shift are recovered.

The wavelength selective element comprises at least a prism and at least an etalon wherein the above novel wavelength-stabilized narrow band excimer laser device may further have at least a beam splitter for causing a laser beam sprite, a spectroscope for measuring a center wavelength of the split laser beam, a beam-position detector for measuring a direction of the laser emission, a first driver for adjusting a laser beam transmission angle of the etalon, a second driver for adjusting an angle of the output mirror, and a controller for controlling both the first driver in accordance with variations in the center wavelength of the laser beam measured by the spectroscope and the second driver in accordance with variations in the direction of the laser emission measured by the beam-position detector.

If the atmosphere surrounding the excimer laser device is changed, the selective wavelength is changed due to a fine variation of the refractive index of the etalon and the refractive variation also appears on the prism whereby the direction of the laser beam of the wavelength selected by the etalon and the total reflection mirror. The controller controls the first driver to adjust the angle of the etalon for recovery of the variation of the wavelength into the allowed range and the second driver to adjust the angle of the output mirror for recovery of the variation in the direction of the laser emission into the allowed range so that the wavelength variation and the optical axis shift are recovered.

The wavelength selective element comprises at least a prism and at least an etalon wherein the above novel wavelength-stabilized narrow band excimer laser device may further have at least a beam splitter for causing a laser beam sprite, a spectroscope for measuring a center wavelength of the split laser beam, a beam-position detector for measuring a direction of the laser emission, a first driver for adjusting a laser beam transmission angle of the etalon, a second driver for adjusting an attitude angle of the etalon and the total reflection mirror without changing a relative position between the etalon and the output mirror, and a controller for controlling both the first driver in accordance with variations in the center wavelength of the laser beam measured by the spectroscope and the second driver in accordance with variations in the direction of the laser emission measured by the beam-position detector.

The controller controls the first driver for adjusting the laser beam transmission angle of the etalon for recovery of the variation in wavelength of the laser beam into the allowed range. The controller also controls the second driver for adjusting the attitude angle of the etalon and the total reflection mirror without changing the relative position between the etalon and the output mirror so that the wavelength variation and the optical axis shift are limited within the allowed ranges. The above control operations are independently carried out. Only the etalon and the total reflection mirror are adjusted so that the optical axis of the cavity is not out of the discharge region in which the laser medium exists in the discharge tube 1.

The wavelength selective element comprises at least a prism and at least an etalon and the prism shows a spectral spread which is two times of free spectral range of the etalon when the prism is used alone for obtaining a narrow band, wherein the above novel wavelength-stabilized narrow band excimer laser device may further have at least a beam splitter for causing a laser beam sprite, a spectroscope for measuring a center wavelength of the split laser beam, a first driver for adjusting a laser beam transmission angle of the etalon, a second driver for adjusting an angle of the total reflection mirror, and a controller for controlling both the first driver in accordance with variations in a main lobe of the spectrum wavelength measured by the spectroscope and the second driver in accordance with a ratio in intensity of a side lobe to the main lobe of the spectrum wavelength measured by the spectroscope and variations in the direction of the laser emission measured by the spectroscope.

In place of the beam-position detector, the spectroscope may be used to measure variations in the direction of the laser emission. It is assumed that only the prism is used for obtaining the narrow band in order to measure variations in the direction of the laser emission by use of the spectroscope in place of the beam-position detector. The prism and the etalon are selected to satisfy λ(prism)=2×λ(FSR) where λ(prism) is the spread of the spectrum and λ(FSR) is the free spectral range.

If the laser beam transmission wavelength of the etalon is set at the center wavelength of the spread of the spectrum λ(prism), then the output laser beam has one wavelength of a selected wavelength or a main lobe. If the laser beam transmission wavelength of the etalon is out of the center wavelength of the spread of the spectrum λ(prism), then the output laser beam has two wavelength of a selected wavelength or a main lobe and a side lobe different by the free spectral range λ(FSR) from the main lobe.

Accordingly, it is possible to judge whether a proper relationship is kept between the prism and the etalon by observing whether there is any variation in intensive ratio of the side lobe to the main lobe.

It is also possible to judge whether the etalon is properly arranged by measuring the wavelength of the main lobe by the spectroscope independently from the prism, for which reason if the wavelength of the main lobe is not shifted and a side lobe appears, this means that the wavelength shift has appears only on the prism.

The adjustment of the wavelength may be made as follows. If any variation appears on the atmosphere surrounding the excimer laser device, the etalon varies in the selective wavelength due to a fine variation of the refractive index thereof whilst the prism varies in the refractive index whereby the direction of the laser beam of the wavelength having been selected by both the etalon and the total reflection mirror is changed. In order to adjust the selective wavelength of the etalon, the adjustment is carried out to the angle of the etalon transmission optical axis. In order to keep the arrangement of the prism properly, the adjustment is carried out to the angle of deviation of the prism. Accordingly, adjustment to either the exit angle or the incident angle is necessary.

The angle of the etalon is adjusted for recovery of the variation in wavelength of the main lobe in the spectrum waveform detected by the spectroscope into the allowed range. The angle of the total reflection mirror is adjusted for recovery of the variation in intensive ratio of the side lobe to the main lobe detected by the spectroscope into the allowed range. The wavelength variation due to the change of the atmosphere may be limited within the allowed ranges.

The wavelength selective element comprises at least a prism and at least an etalon and the prism shows a spectral spread which is two times of free spectral range of the etalon when the prism is used alone for obtaining a narrow band, wherein the above novel wavelength-stabilized narrow band excimer laser device may further have at least a beam splitter for causing a laser beam sprite, a spectroscope for measuring a center wavelength of the split laser beam, a first driver for adjusting a laser beam transmission angle of the etalon, a second driver for adjusting an angle of the output mirror, and a controller for controlling both the first driver in accordance with variations in a main lobe of the spectrum wavelength measured by the spectroscope and the second driver in accordance with a ratio in intensity of a side lobe to the main lobe of the spectrum wavelength measured by the spectroscope and variations in the direction of the laser emission measured by the spectroscope.

The angle of the etalon is adjusted for recovery of the variation in wavelength of the main lobe in the spectrum waveform detected by the spectroscope into the allowed range. The angle of the output mirror is adjusted for recovery of the variation in intensive ratio of the side lobe to the main lobe detected by the spectroscope into the allowed range. The wavelength variation due to the change of the atmosphere may be limited within the allowed ranges. Both the adjustment operations may be made independently from each other.

The wavelength selective element comprises at least a prism and at least an etalon and the prism shows a spectral spread which is two times of free spectral range of the etalon when the prism is used alone for obtaining a narrow band, wherein the above novel wavelength-stabilized narrow band excimer laser device may further have at least a beam splitter for causing a laser beam sprite, a spectroscope for measuring a center wavelength of the split laser beam, a first driver for adjusting a laser beam transmission angle of the etalon, a second driver for adjusting an attitude angle of the total reflection mirror and the etalon without changing a relative position between the total reflection mirror and the etalon, and a controller for controlling both the first driver in accordance with variations in a main lobe of the spectrum wavelength measured by the spectroscope and the second driver in accordance with a ratio in intensity of a side lobe to the main lobe of the spectrum wavelength measured by the spectroscope and variations in the direction of the laser emission measured by the spectroscope.

The angle of the etalon is adjusted for recovery of the variation in wavelength of the main lobe in the spectrum waveform detected by the spectroscope into the allowed range. The attitude angle of the total reflection mirror and the etalon is adjusted, without changing a relative position between the total reflection mirror and the etalon, for recovery of the variation in intensive ratio of the side lobe to the main lobe detected by the spectroscope into the allowed range. The wavelength variation due to the change of the atmosphere may be limited within the allowed ranges. Both the adjustment operations may be made independently from each other. Only the etalon and the total reflection mirror are adjusted so that the optical axis of the cavity is not out of the discharge region in which the laser medium exists in the discharge tube 1.

The optical beam splitter may optionally comprise either a partial reflection mirror or an optical fiber.

EMBODIMENTS

Figure 2:
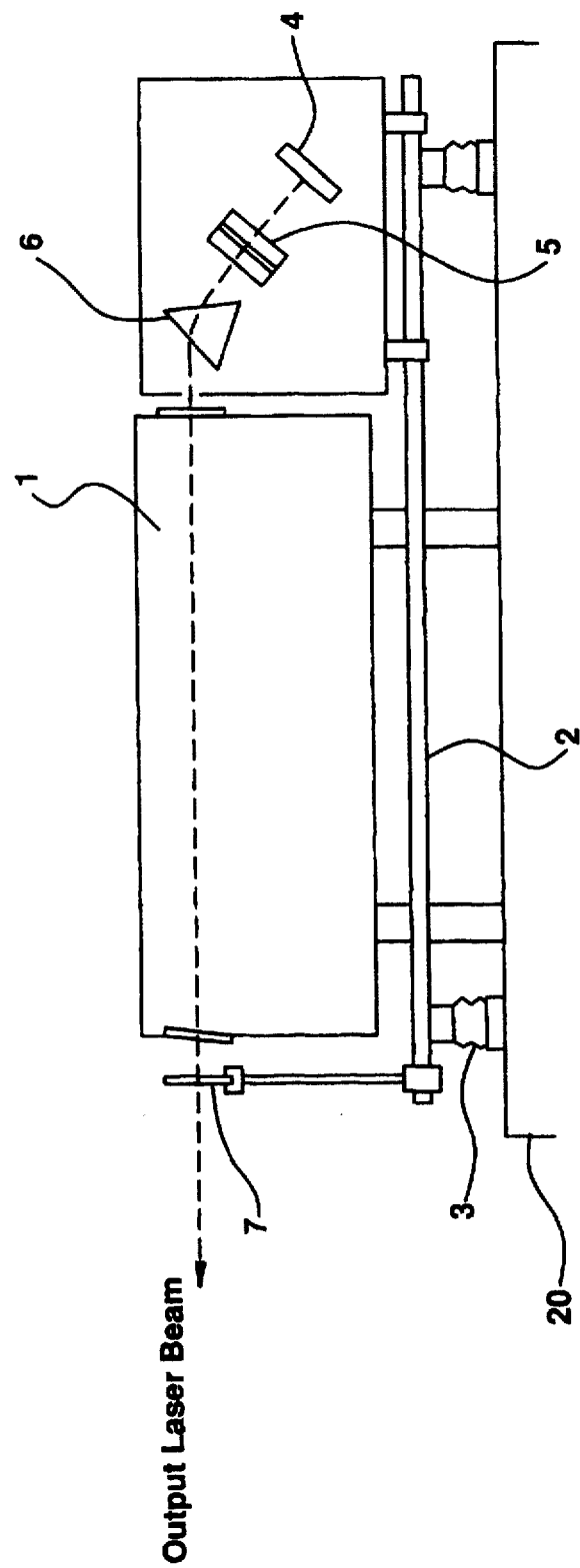
FIG. 2 is a schematic view illustrative of a novel wavelength-stabilized narrow band excimer laser device in a first embodiment according to the present invention.

A first embodiment according to the present invention will be described with reference to FIG. 2, wherein a novel wavelength-stabilized narrow band excimer laser device adopted for facilitation of the wavelength stabilization and free of any optical axis shift is provided.

A wavelength-stabilized narrow band excimer laser device has a discharge tube 1, a cavity formed of both an output mirror 7 at a front side and a total reflection mirror 4 at a rear side, an etalon 5, a prism 6, wherein the output mirror 7, the total reflection mirror 4, the etalon 5 and the prism 6 are securely fixed on a supporting structure 2 of an Invar rod with an extremely small thermal expansion coefficient. The supporting structure 2 is mounted via a vibration removing device over a mount 20 on which the discharge tube 1 is also mounted so that the output mirror 7, the total reflection mirror 4, the etalon 5 and the prism 6 are free from any vibration of the discharge tube 1 due to a gas circulation fun provided on the discharge tube 1.

As described above, the output mirror 7, the total reflection mirror 4, the etalon 5 and the prism 6 are securely fixed on the supporting structure 2 which is mounted via the vibration removing device 3 over the mount 20 on which the discharge tube 1 is also mounted so that the output mirror 7, the total reflection mirror 4, the etalon 5 and the prism 6 are free from any vibration of the discharge tube 1, for which reason the above novel excimer laser device is free from any variation in wavelength of the output laser beam, and a reduction in output of the laser beam as well as variation in direction of the laser emission.

Figure 3:
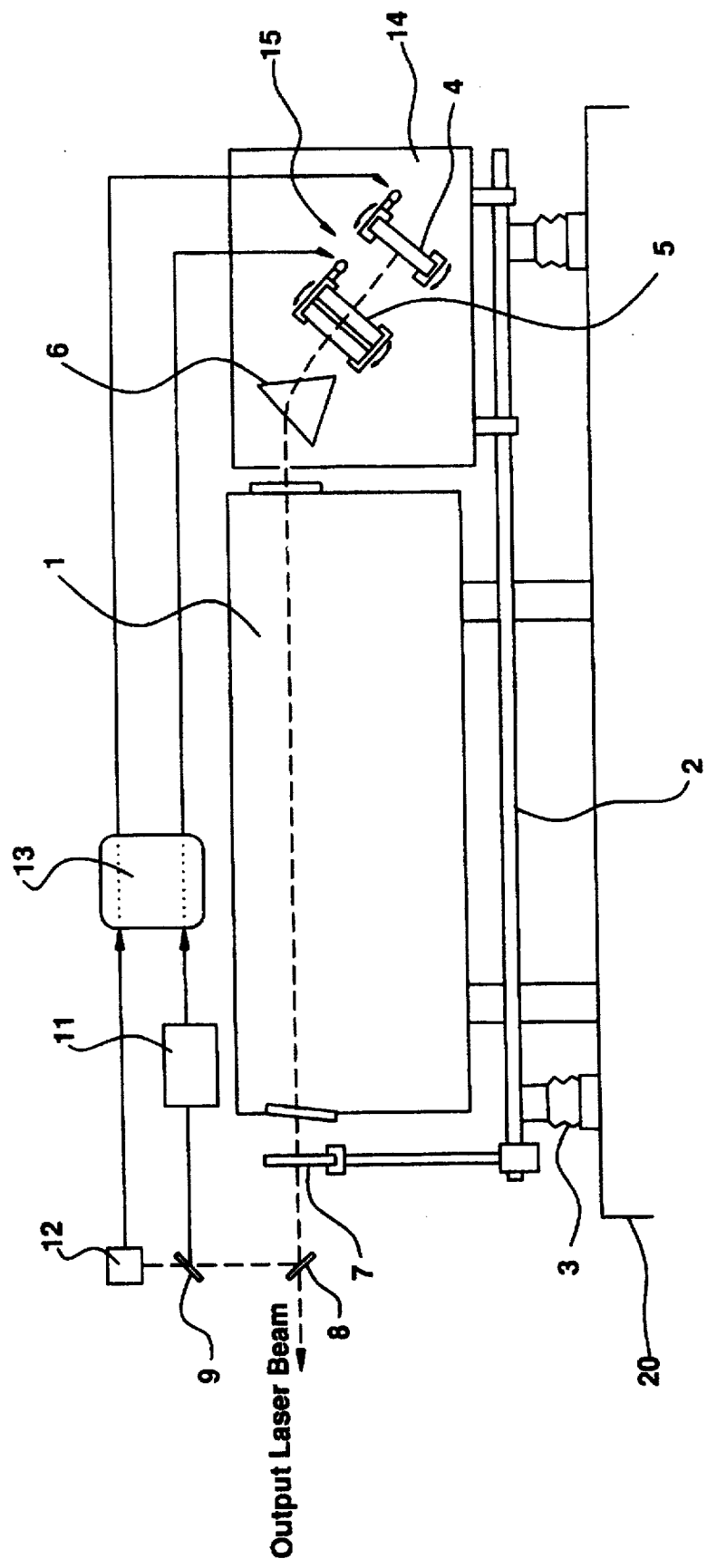
FIG. 3 is a schematic view illustrative of a novel wavelength-stabilized narrow band excimer laser device in a second embodiment according to the present invention.

A second embodiment according to the present invention will be described with reference to FIG. 3, wherein a novel wavelength-stabilized narrow band excimer laser device adopted for facilitation of the wavelength stabilization and free of any optical axis shift is provided.

A wavelength-stabilized narrow band excimer laser device has a discharge tube 1, a cavity formed of both an output mirror 7 at a front side and a total reflection mirror 4 at a rear side, an etalon 5, a prism 6, wherein the output mirror 7, the total reflection mirror 4, the etalon 5 and the prism 6 are securely fixed on a supporting structure 2 of an Invar rod with an extremely small thermal expansion coefficient. The supporting structure 2 is mounted via a vibration removing device over a mount 20 on which the discharge tube 1 is also mounted so that the output mirror 7, the total reflection mirror 4, the etalon 5 and the prism 6 are free from any vibration of the discharge tube 1 due to a gas circulation fun provided on the discharge tube 1. The above novel wavelength-stabilized narrow band excimer laser device further has beam splitter 8 and 9 for causing a laser beam sprite, a spectroscope 11 for measuring a center wavelength of the split laser beam, a beam-position detector 12 for measuring a direction of the laser emission, an etalon angle adjusting device 15 for adjusting a laser beam transmission angle of the etalon 5, a total reflection mirror angle adjuster 14 for adjusting an angle of the total reflection mirror 4, and a central processing unit 13 as a controller for controlling both the etalon angle adjusting device 15 in accordance with variations in the center wavelength of the laser beam measured by the spectroscope 11 and the total reflection mirror angle adjuster 14 in accordance with variations in the direction of the laser emission measured by the beam-position detector.

The output of the laser beam is partially transmitted via the beam splitter 8 and 9 into the spectroscope 11 and into the beam-position detector 12. The output of the spectroscope 11 and the beam-position detector 12 are fetched by the central processing unit 13. The central processing unit 13 supplies the control signals to the total reflection mirror angle adjuster 14 and the etalon angle adjusting device 15.

If the atmosphere surrounding the excimer laser device is changed, the selective wavelength of the etalon 5 is changed due to a fine variation of the refractive index of the etalon 5 and the refractive variation also appears on the prism 6 whereby the exit angle of the laser beam of the wavelength selected by the etalon 5 is changed. The central processing unit 13 controls the etalon angle adjusting device 15 to adjust the angle of the etalon 5 for recovery of the variation of the wavelength into the allowed range. The central processing unit 13 also controls the total reflection mirror angle adjuster 14 to adjust the angle of the total reflection mirror for recovery of the variation in the direction of the laser emission into the allowed range so that the wavelength variation and the optical axis shift are recovered.

Figure 4:
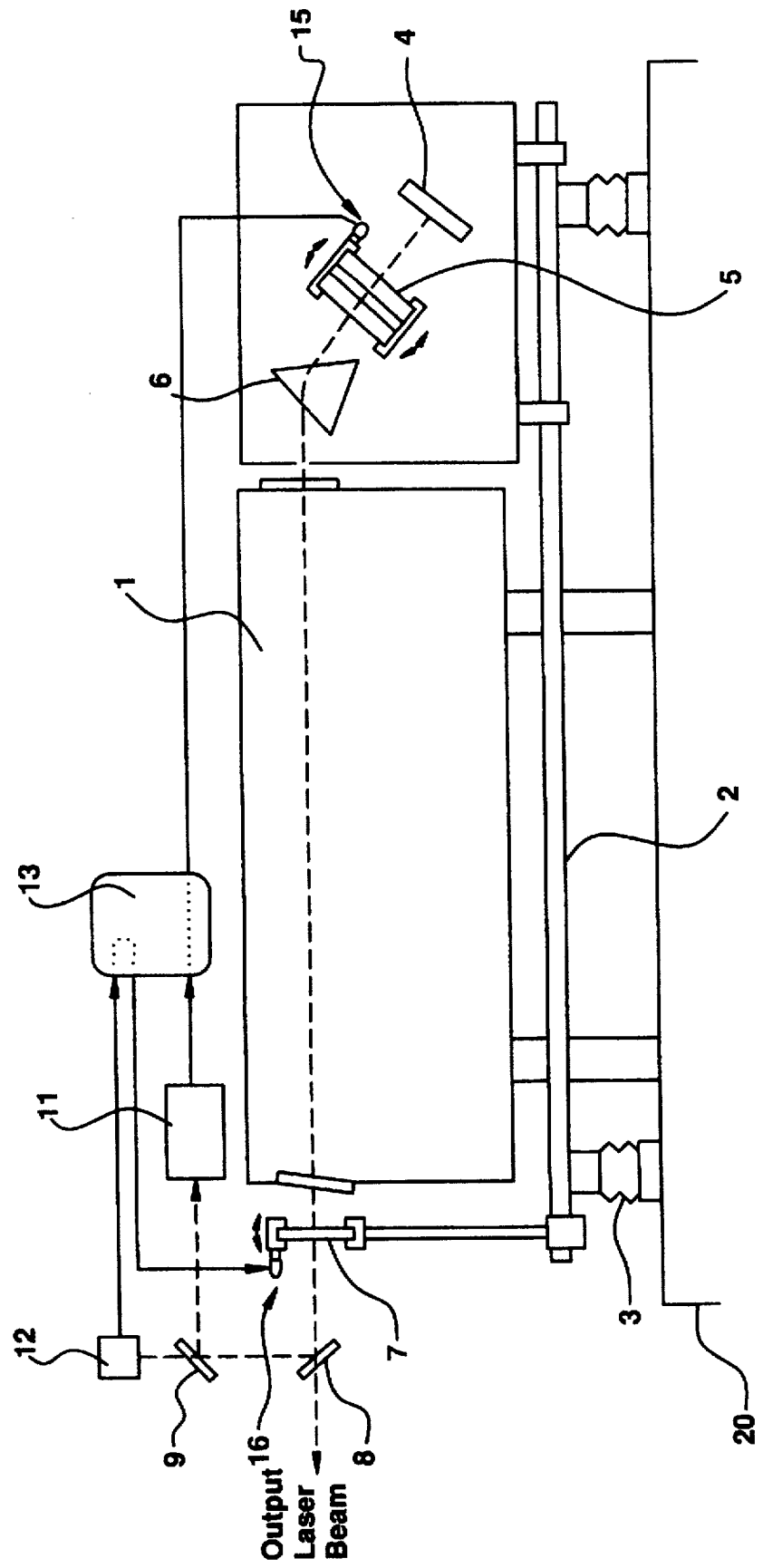
FIG. 4 is a schematic view illustrative of a novel wavelength-stabilized narrow band excimer laser device in a third embodiment according to the present invention.

A third embodiment according to the present invention will be described with reference to FIG. 4, wherein a novel wavelength-stabilized narrow band excimer laser device adopted for facilitation of the wavelength stabilization and free of any optical axis shift is provided.

A wavelength-stabilized narrow band excimer laser device has a discharge tube 1, a cavity formed of both an output mirror 7 at a front side and a total reflection mirror 4 at a rear side, an etalon 5, a prism 6, wherein the output mirror 7, the total reflection mirror 4, the etalon 5 and the prism 6 are securely fixed on a supporting structure 2 of an Invar rod with an extremely small thermal expansion coefficient. The supporting structure 2 is mounted via a vibration removing device over a mount 20 on which the discharge tube 1 is also mounted so that the output mirror 7, the total reflection mirror 4, the etalon 5 and the prism 6 are free from any vibration of the discharge tube 1 due to a gas circulation fun provided on the discharge tube 1. The above novel wavelength-stabilized narrow band excimer laser device further has beam splitter 8 and 9 for causing a laser beam sprite, a spectroscope 11 for measuring a center wavelength of the split laser beam, a beam-position detector 12 for measuring a direction of the laser emission, an etalon angle adjusting device 15 for adjusting a laser beam transmission angle of the etalon 5, a total reflection mirror angle adjuster 14 for adjusting an angle of the total reflection mirror 4, and a central processing unit 13 as a controller for controlling both the etalon angle adjusting device 15 in accordance with variations in the center wavelength of the laser beam measured by the spectroscope 11 and the total reflection mirror angle adjuster 14 in accordance with variations in the direction of the laser emission measured by the beam-position detector.

Further, an output mirror angle adjuster 16 is provided for adjusting the angle of the output mirror 7 in accordance with the control signal from the central processing unit 13 as a controller.

The output of the laser beam is partially transmitted via the beam splitter 8 and 9 into the spectroscope 11 and into the beam-position detector 12. The output of the spectroscope 11 and the beam-position detector 12 are fetched by the central processing unit 13. The central processing unit 13 supplies the control signals to the output mirror angle adjuster 16 and the etalon angle adjusting device 15.

If the atmosphere surrounding the excimer laser device is changed, the selective wavelength of the etalon 5 is changed due to a fine variation of the refractive index of the etalon 5 and the refractive variation also appears on the prism 6 whereby the exit angle of the laser beam of the wavelength selected by the etalon 5 is changed. The central processing unit 13 controls the etalon angle adjusting device 15 to adjust the angle of the etalon 5 for recovery of the variation of the wavelength into the allowed range. The central processing unit 13 also controls the output mirror angle adjuster 16 to adjust the angle of the output mirror for recovery of the variation in the direction of the laser emission into the allowed range so that the wavelength variation and the optical axis shift are recovered.

Since the wavelength of the output laser beam is determined by the angle of the total reflection mirror 4 and the etalon 5, then no interference appears between the control of the direction of the laser beam emitted and the control of the wavelength of the laser beam.

Figure 5:
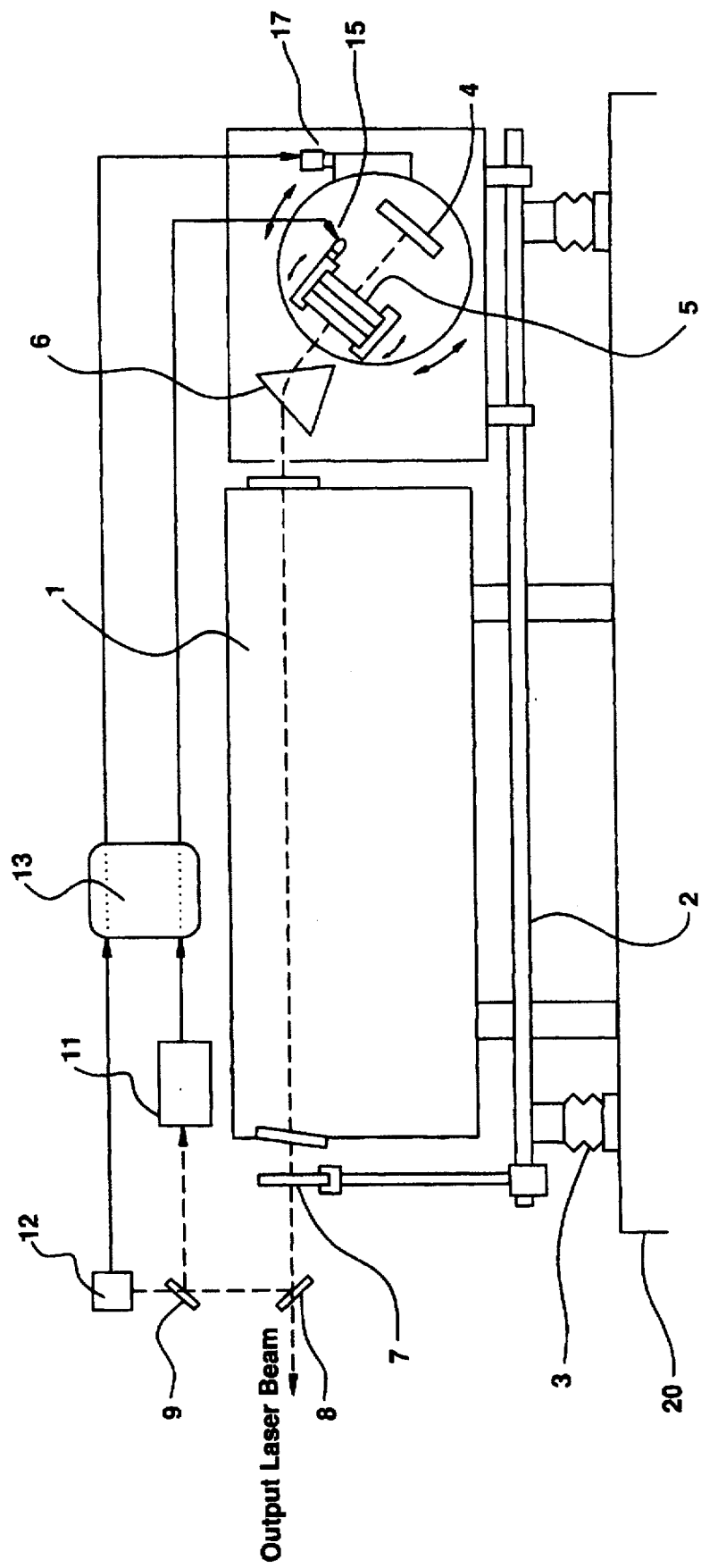
FIG. 5 is a schematic view illustrative of a novel wavelength-stabilized narrow band excimer laser device in a fourth embodiment according to the present invention.

A fourth embodiment according to the present invention will be described with reference to FIG. 5, wherein a novel wavelength-stabilized narrow band excimer laser device adopted for facilitation of the wavelength stabilization and free of any optical axis shift is provided.

A wavelength-stabilized narrow band excimer laser device has a discharge tube 1, a cavity formed of both an output mirror 7 at a front side and a total reflection mirror 4 at a rear side, an etalon 5, a prism 6, wherein the output mirror 7, the total reflection mirror 4, the etalon 5 and the prism 6 are securely fixed on a supporting structure 2 of an Invar rod with an extremely small thermal expansion coefficient. The supporting structure 2 is mounted via a vibration removing device over a mount 20 on which the discharge tube 1 is also mounted so that the output mirror 7, the total reflection mirror 4, the etalon 5 and the prism 6 are free from any vibration of the discharge tube 1 due to a gas circulation fun provided on the discharge tube 1. The above novel wavelength-stabilized narrow band excimer laser device further has beam splitter 8 and 9 for causing a laser beam sprite, a spectroscope 11 for measuring a center wavelength of the split laser beam, a beam-position detector 12 for measuring a direction of the laser emission, an etalon angle adjusting device 15 for adjusting a laser beam transmission angle of the etalon 5, an angle adjuster 17 for adjusting an angle of the total reflection mirror 4 and the etalon 5 without changing a relative position between the total reflection mirror 4 and the etalon 5, and a central processing unit 13 as a controller for controlling both the etalon angle adjusting device 15 in accordance with variations in the center wavelength of the laser beam measured by the spectroscope 11 and the angle adjuster 17 in accordance with variations in the direction of the laser emission measured by the beam-position detector.

The output of the laser beam is partially transmitted via the beam splitter 8 and 9 into the spectroscope 11 and into the beam-position detector 12. The output of the spectroscope 11 and the beam-position detector 12 are fetched by the central processing unit 13. The central processing unit 13 supplies the control signals to the angle adjuster 17 and the etalon angle adjusting device 15.

If the atmosphere surrounding the excimer laser device is changed, the selective wavelength of the etalon 5 is changed due to a fine variation of the refractive index of the etalon 5 and the refractive variation also appears on the prism 6 whereby the exit angle of the laser beam of the wavelength selected by the etalon 5 is changed. The central processing unit 13 controls the etalon angle adjusting device 15 to adjust the angle of the etalon 5 for recovery of the variation of the wavelength into the allowed range. The central processing unit 13 also controls the angle adjuster 17 to adjust the angle of the total reflection mirror 4 and the etalon 5 without changing a relative position between the total reflection mirror 4 and the etalon 5 for recovery of the variation in the direction of the laser emission into the allowed range so that the wavelength variation and the optical axis shift are recovered.

The wavelength of the output laser beam is determined by the angle of the total reflection mirror 4 and the etalon 5 and the control of the emitted laser beam direction is carried out by the angle adjuster 17 without changing the relative position between the total reflection mirror 4 and the etalon 5, for which reason no variation appears on the wavelength of the laser beam.

Only the etalon 5 and the total reflection mirror 4 are adjusted so that the optical axis of the cavity is not out of the discharge region in which the laser medium exists in the discharge tube 1.

Figure 6:
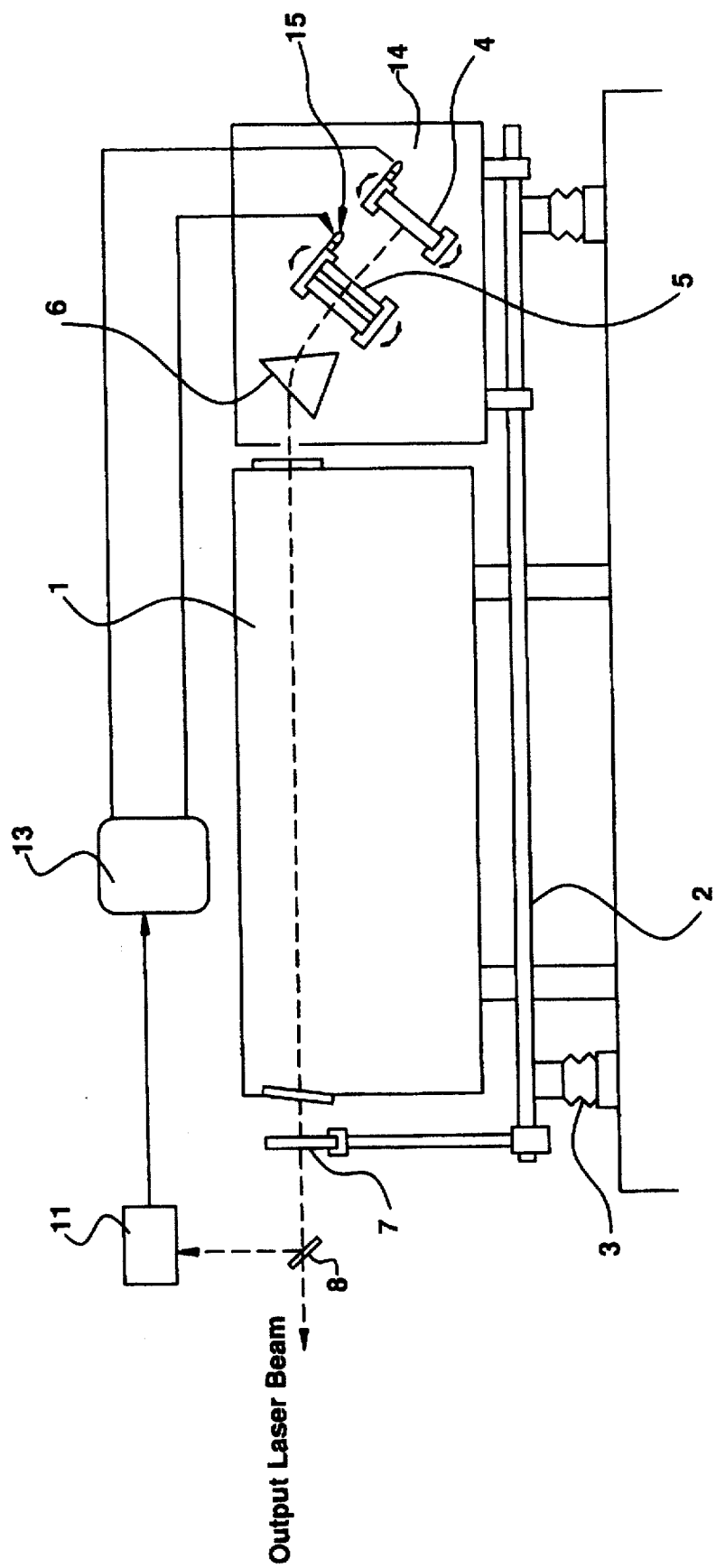
FIG. 6 is a schematic view illustrative of a novel wavelength-stabilized narrow band excimer laser device in a fifth embodiment according to the present invention.

A fifth embodiment according to the present invention will be described with reference to FIG. 6, wherein a novel wavelength-stabilized narrow band excimer laser device adopted for facilitation of the wavelength stabilization and free of any optical axis shift is provided.

A wavelength-stabilized narrow band excimer laser device has a discharge tube 1, a cavity formed of both an output mirror 7 at a front side and a total reflection mirror 4 at a rear side, an etalon 5, a prism 6, wherein the output mirror 7, the total reflection mirror 4, the etalon 5 and the prism 6 are securely fixed on a supporting structure 2 of an Invar rod with an extremely small thermal expansion coefficient. The supporting structure 2 is mounted via a vibration removing device over a mount 20 on which the discharge tube 1 is also mounted so that the output mirror 7, the total reflection mirror 4, the etalon 5 and the prism 6 are free from any vibration of the discharge tube 1 due to a gas circulation fun provided on the discharge tube 1.

The prism 6 shows a spectral spread which is approximately two times of free spectral range of the etalon 5 when the prism 6 is used alone for obtaining a narrow band, wherein the above novel wavelength-stabilized narrow band excimer laser device further has at least a beam splitter for causing a laser beam sprite, a spectroscope 11 for measuring a center wavelength of the split laser beam, an etalon transmission angle adjuster 15 for adjusting a laser beam transmission angle of the etalon 5, a total reflection mirror angle adjuster 14 for adjusting an angle of the total reflection mirror 4, and a central processing unit 13 as a controller for controlling both the etalon transmission angle adjuster 15 in accordance with variations in a main lobe of the spectrum wavelength measured by the spectroscope 11 and the total reflection mirror angle adjuster 14 in accordance with a ratio in intensity of a side lobe to the main lobe of the spectrum wavelength measured by the spectroscope 11 and variations in the direction of the laser emission measured by the spectroscope 11.

In place of the beam-position detector 12, the spectroscope 11 may be used to measure variations in the direction of the laser emission. It is assumed that only the prism 6 is used for obtaining the narrow band in order to measure variations in the direction of the laser emission by use of the spectroscope 11 in place of the beam-position detector 12. The prism 6 and the etalon 5 are selected to satisfy λ(prism) =2×λ(FSR) where λ(prism) is the spread of the spectrum and λ(FSR) is the free spectral range.

If the laser beam transmission wavelength of the etalon 5 is set at the center wavelength of the spread of the spectrum λ(prism), then the output laser beam has one wavelength of a selected wavelength or a main lobe. If the laser beam transmission wavelength of the etalon 5 is out of the center wavelength of the spread of the spectrum λ(prism), then the output laser beam has two wavelengths of a selected wavelength or a main lobe and a side lobe different by the free spectral range λ(FSR) from the main lobe.

Accordingly, it is possible to judge whether a proper relationship is kept between the prism 6 and the etalon 5 by observing whether there is any variation in intensive ratio of the side lobe to the main lobe.

It is also possible to judge whether the etalon 5 is properly arranged by measuring the wavelength of the main lobe by the spectroscope independently from the prism 6, for which reason if the wavelength of the main lobe is not shifted and a side lobe appears, this means that the wavelength shift has appears only on the prism 6.

The adjustment of the wavelength may be made as follows. If any variation appears on the atmosphere surrounding the excimer laser device, the etalon varies in the selective wavelength due to a fine variation of the refractive index thereof whilst the prism varies in the refractive index whereby the direction of the laser beam of the wavelength having been selected by both the etalon and the total reflection mirror is changed. In order to adjust the selective wavelength of the etalon, the adjustment is carried out to the angle of the etalon transmission optical axis. In order to keep the arrangement of the prism 6 properly, the adjustment is carried out to the angle of deviation of the prism 6. Accordingly, adjustment to either the exit angle or the incident angle is necessary.

The angle of the etalon 5 is adjusted for recovery of the variation in wavelength of the main lobe in the spectrum waveform detected by the spectroscope 11 into the allowed range. The angle of the total reflection mirror 4 is adjusted for recovery of the variation in intensive ratio of the side lobe to the main lobe detected by the spectroscope 11 into the allowed range. The wavelength variation due to the change of the atmosphere may be limited within the allowed ranges.

Figure 7:
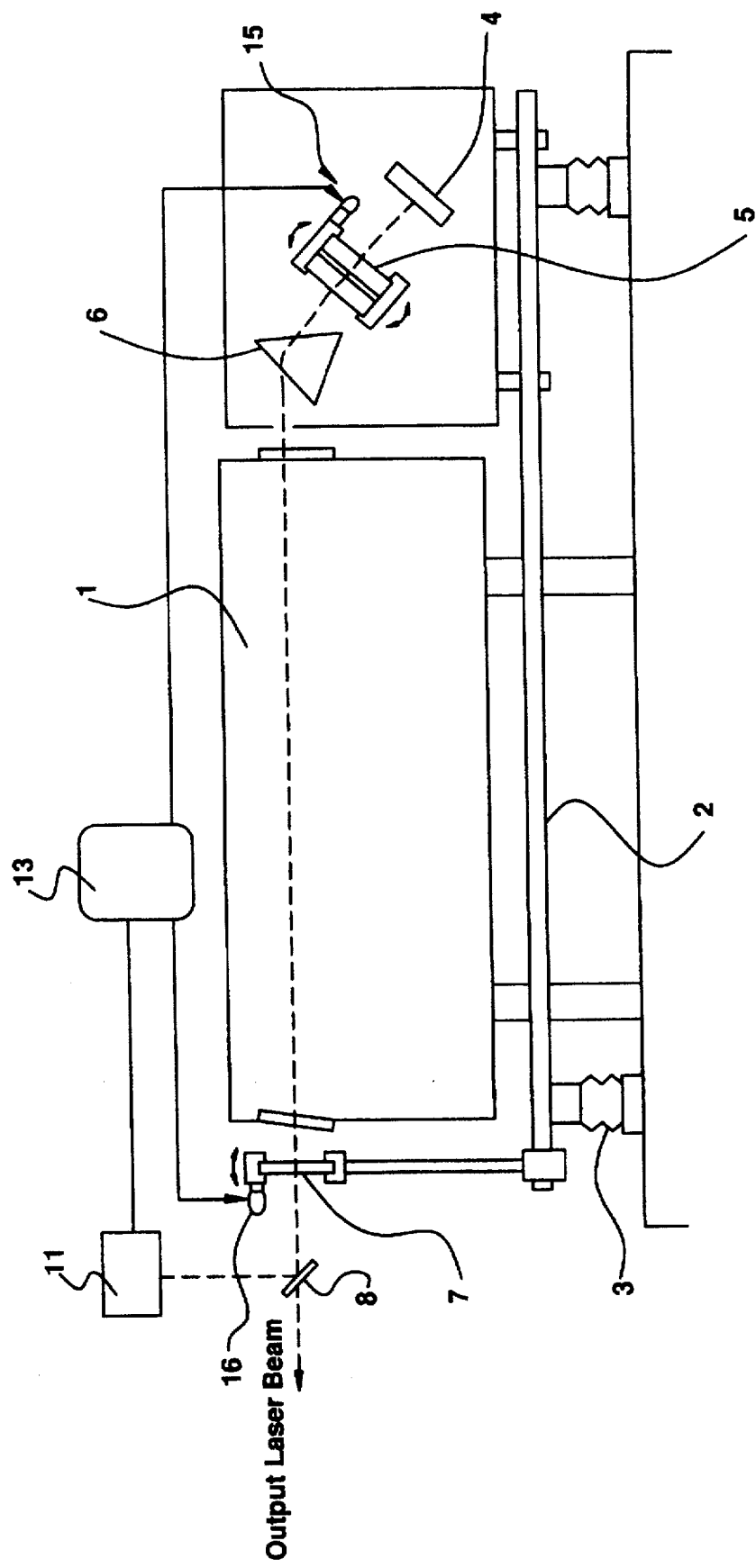
FIG. 7 is a schematic view illustrative of a novel wavelength-stabilized narrow band excimer laser device in a sixth embodiment according to the present invention.

A sixth embodiment according to the present invention will be described with reference to FIG. 7, wherein a novel wavelength-stabilized narrow band excimer laser device adopted for facilitation of the wavelength stabilization and free of any optical axis shift is provided.

A wavelength-stabilized narrow band excimer laser device has a discharge tube 1, a cavity formed of both an output mirror 7 at a front side and a total reflection mirror 4 at a rear side, an etalon 5, a prism 6, wherein the output mirror 7, the total reflection mirror 4, the etalon 5 and the prism 6 are securely fixed on a supporting structure 2 of an Invar rod with an extremely small thermal expansion coefficient. The supporting structure 2 is mounted via a vibration removing device over a mount 20 on which the discharge tube 1 is also mounted so that the output mirror 7, the total reflection mirror 4, the etalon 5 and the prism 6 are free from any vibration of the discharge tube 1 due to a gas circulation fun provided on the discharge tube 1.

The above novel wavelength-stabilized narrow band excimer laser device further has a beam splitter 8 for causing a laser beam sprite, a spectroscope 11 for measuring a center wavelength of the split laser beam, an etalon transmission angle adjuster 15 for adjusting a laser beam transmission angle of the etalon 5, an output mirror angle adjuster 16 for adjusting an angle of the output mirror 7, and a central processing unit 13 as a controller for controlling both the etalon transmission angle adjuster 15 in accordance with variations in a main lobe of the spectrum wavelength measured by the spectroscope 11 and the output mirror angle adjuster 16 in accordance with a ratio in intensity of a side lobe to the main lobe of the spectrum wavelength measured by the spectroscope 11 and variations in the direction of the laser emission measured by the spectroscope 11.

The angle of the etalon 5 is adjusted for recovery of the variation in wavelength of the main lobe in the spectrum waveform detected by the spectroscope 11 into the allowed range. The angle of the output mirror 7 is adjusted for recovery of the variation in intensive ratio of the side lobe to the main lobe detected by the spectroscope 11 into the allowed range. The wavelength variation due to the change of the atmosphere may be limited within the allowed ranges. Both the adjustment operations may be made independently from each other.

Figure 8:
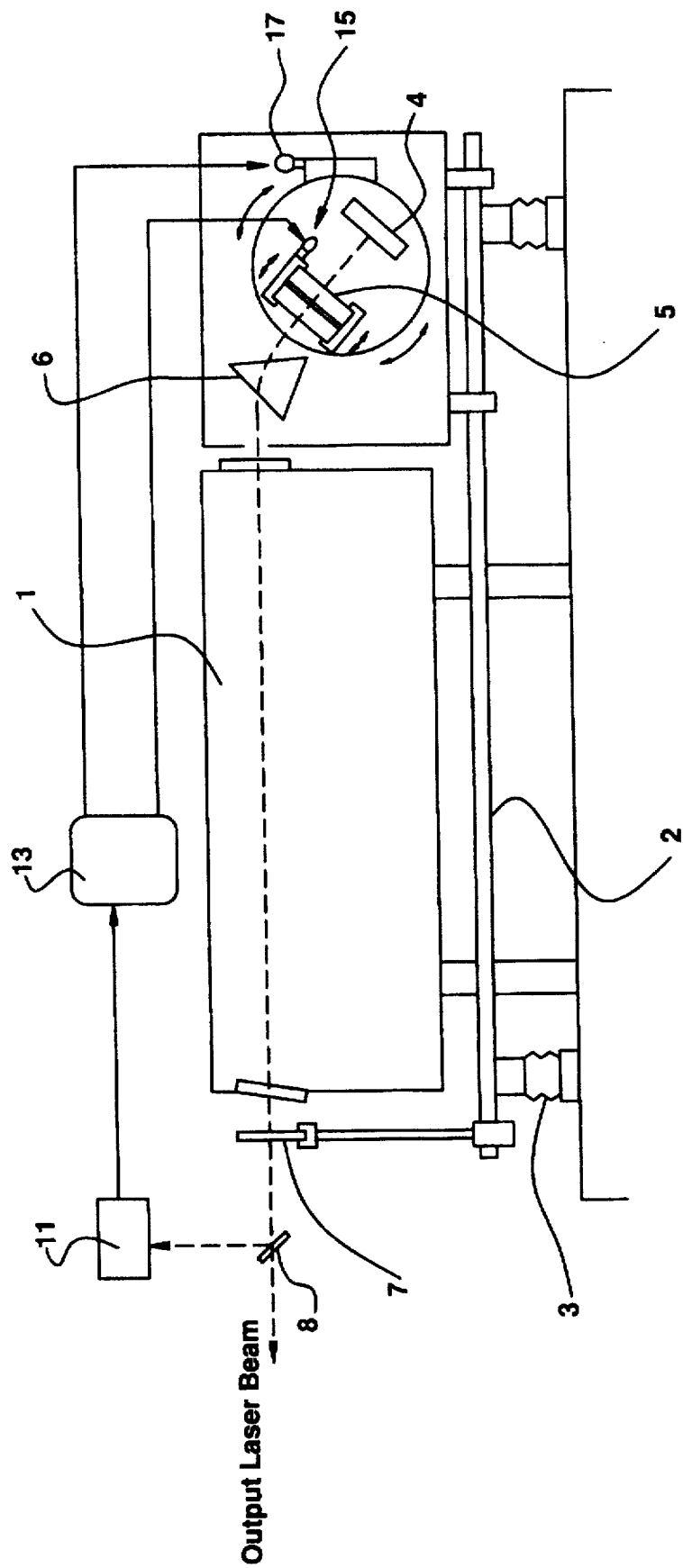
FIG. 8 is a schematic view illustrative of a novel wavelength-stabilized narrow band excimer laser device in a seventh embodiment according to the present invention.
Figure 9A:
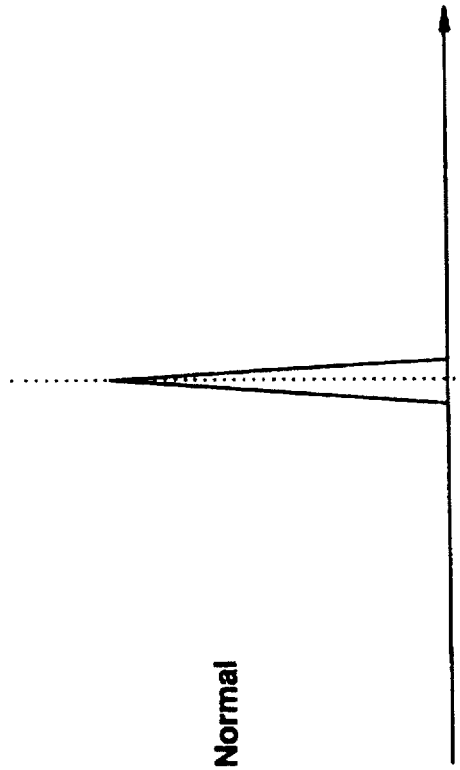
FIG. 9 is a view illustrative of a spectrum waveform shift due to variation of the wavelength selected by the etalon.
Figure 9B:
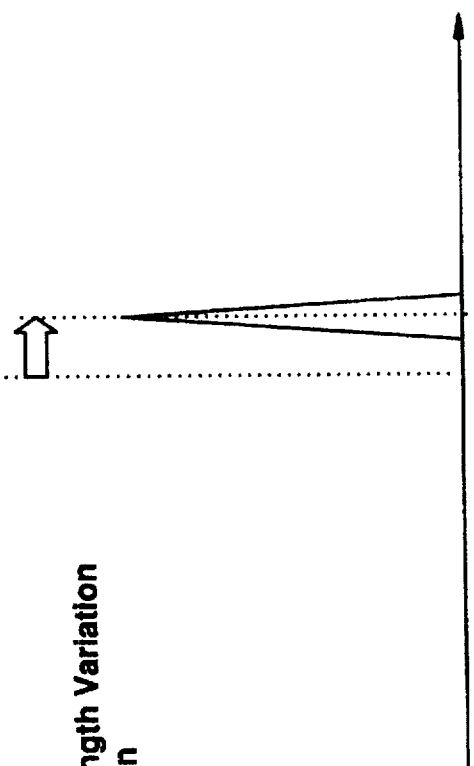

A seventh embodiment according to the present invention will be described with reference to FIG. 8, wherein a novel wavelength-stabilized narrow band excimer laser device adopted for facilitation of the wavelength stabilization and free of any optical axis shift is provided.

A wavelength-stabilized narrow band excimer laser device has a discharge tube 1, a cavity formed of both an output mirror 7 at a front side and a total reflection mirror 4 at a rear side, an etalon 5, a prism 6, wherein the output mirror 7, the total reflection mirror 4, the etalon 5 and the prism 6 are securely fixed on a supporting structure 2 of an Invar rod with an extremely small thermal expansion coefficient. The supporting structure 2 is mounted via a vibration removing device over a mount 20 on which the discharge tube 1 is also mounted so that the output mirror 7, the total reflection mirror 4, the etalon 5 and the prism 6 are free from any vibration of the discharge tube 1 due to a gas circulation fun provided on the discharge tube 1.

The above novel wavelength-stabilized narrow band excimer laser device further has a beam splitter 8 for causing a laser beam sprite, a spectroscope 11 for measuring a center wavelength of the split laser beam, an etalon transmission angle adjuster 15 for adjusting a laser beam transmission angle of the etalon 5, an etalon-mirror angle adjuster 17 for adjusting an attitude angle of the total reflection mirror 4 and the etalon 5 without changing a relative position between the total reflection mirror 4 and the etalon 5, and a central processing unit 13 as a controller for controlling both the etalon transmission angle adjuster 15 in accordance with variations in a main lobe of the spectrum wavelength measured by the spectroscope 11 and the etalon-mirror angle adjuster 17 in accordance with a ratio in intensity of a side lobe to the main lobe of the spectrum wavelength measured by the spectroscope 11 and variations in the direction of the laser emission measured by the spectroscope 11.

The angle of the etalon 5 is adjusted for recovery of the variation in wavelength of the main lobe in the spectrum waveform detected by the spectroscope 11 into the allowed range. The attitude angle of the total reflection mirror 4 and the etalon 5 is adjusted, without changing a relative position between the total reflection mirror 4 and the etalon 5, for recovery of the variation in intensive ratio of the side lobe to the main lobe detected by the spectroscope 11 into the allowed range. The wavelength variation due to the change of the atmosphere may be limited within the allowed ranges. Both the adjustment operations may be made independently from each other. Only the etalon 5 and the total reflection mirror 4 are adjusted so that the optical axis of the cavity is not out of the discharge region in which the laser medium exists in the discharge tube 1.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. A laser device comprising:
a discharge tube;
a cavity formed of an output mirror at a front side and a total reflection mirror at a rear side; and
a wavelength selective means positioned between the front and rear mirrors,
wherein the output mirror, the total reflection mirror and the wavelength selective element are securely fixed on a supporting structure which is mounted via a vibration removing device over a mount on which the discharge tube is mounted so that the output mirror, the total reflection mirror and the wavelength selective element are free from any vibration of the discharge tube.

2. A laser device comprising:
a discharge tube;
a cavity formed of an output mirror at a front side and a total reflection mirror at a rear side;
an etalon positioned between the front and rear mirrors;
at least a beam splitter for causing a laser beam sprite;
a spectroscope for measuring a center wavelength of the split laser beam;
a beam-position detector for measuring a direction of the laser emission;
a first driver for adjusting a laser beam transmission angle of the etalon;
a second driver for adjusting an angle of the total reflection mirror; and
a controller for controlling both the first driver in accordance with variations in the center wavelength of the laser beam measured by the spectroscope and the second driver in accordance with variations in the direction of the laser emission measured by the beam-position detector.

3. The laser device as claimed in claim 2, wherein the output mirror, the total reflection mirror, the beam spritter and the etalon are securely fixed on a supporting structure which is mounted via a vibration removing device over a mount on which the discharge tube is mounted so that the output mirror, the total reflection mirror and the wavelength selective element are free from any vibration of the discharge tube.

4. A laser device comprising:
a discharge tube;
a cavity formed of an output mirror at a front side and a total reflection mirror at a rear side;
an etalon positioned between the front and rear mirrors;
at least a beam splitter for causing a laser beam sprite;
a spectroscope for measuring a center wavelength of the split laser beam;
a beam-position detector for measuring a direction of the laser emission;
a first driver for adjusting a laser beam transmission angle of the etalon;
a second driver for adjusting an angle of the output mirror; and
a controller for controlling both the first driver in accordance with variations in the center wavelength of the laser beam measured by the spectroscope and the second driver in accordance with variations in the direction of the laser emission measured by the beam-position detector.

5. The laser device as claimed in claim 4, wherein the output mirror, the total reflection mirror, the beam spritter and the etalon are securely fixed on a supporting structure which is mounted via a vibration removing device over a mount on which the discharge tube is mounted so that the output mirror, the total reflection mirror and the wavelength selective element are free from any vibration of the discharge tube.

6. A laser device comprising:
a discharge tube;
a cavity formed of an output mirror at a front side and a total reflection mirror at a rear side;
an etalon positioned between the front and rear mirrors;
at least a beam splitter for causing a laser beam sprite;
a spectroscope for measuring a center wavelength of the split laser beam;
a beam-position detector for measuring a direction of the laser emission;
a first driver for adjusting a laser beam transmission angle of the etalon;
a second driver for adjusting an attitude angle of the etalon and the total reflection mirror without changing a relative position between the etalon and the output mirror; and
a controller for controlling both the first driver in accordance with variations in the center wavelength of the laser beam measured by the spectroscope and the second driver in accordance with variations in the direction of the laser emission measured by the beam-position detector.

7. The laser device as claimed in claim 6, wherein the output mirror, the total reflection mirror, the beam spritter and the etalon are securely fixed on a supporting structure which is mounted via a vibration removing device over a mount on which the discharge tube is mounted so that the output mirror, the total reflection mirror and the wavelength selective element are free from any vibration of the discharge tube.

8. A laser device comprising:

a discharge tube;

a cavity formed of an output mirror at a front side and a total reflection mirror at a rear side;

an etalon positioned between the front and rear mirrors;

at least a beam splitter for causing a laser beam sprite;

a spectroscope for measuring a center wavelength of the split laser beam;

a first driver for adjusting a laser beam transmission angle of the etalon;

a second driver for adjusting an angle of the total reflection mirror; and a controller for controlling both the first driver in accordance with variations in a main lobe of the spectrum wavelength measured by the spectroscope and the second driver in accordance with a ratio in intensity of a side lobe to the main lobe of the spectrum wavelength measured by the spectroscope and variations in the direction of the laser emission measured by the spectroscope.

9. The laser device as claimed in claim 8, wherein the output mirror, the total reflection mirror, the beam spritter and the etalon are securely fixed on a supporting structure which is mounted via a vibration removing device over a mount on which the discharge tube is mounted so that the output mirror, the total reflection mirror and the wavelength selective element are free from any vibration of the discharge tube.

10. A laser device comprising:

a discharge tube;

a cavity formed of an output mirror at a front side and a total reflection mirror at a rear side;

an etalon positioned between the front and rear mirrors;

at least a beam splitter for causing a laser beam sprite;

a spectroscope for measuring a center wavelength of the split laser beam;

a first driver for adjusting a laser beam transmission angle of the etalon;

a second driver for adjusting an angle of the output mirror; and a controller for controlling both the first driver in accordance with variations in a main lobe of the spectrum wavelength measured by the spectroscope and the second driver in accordance with a ratio in intensity of a side lobe to the main lobe of the spectrum wavelength measured by the spectroscope and variations in the direction of the laser emission measured by the spectroscope.

11. The laser device as claimed in claim 10, wherein the output mirror, the total reflection mirror, the beam spritter and the etalon are securely fixed on a supporting structure which is mounted via a vibration removing device over a mount on which the discharge tube is mounted so that the output mirror, the total reflection mirror and the wavelength selective element are free from any vibration of the discharge tube.

12. A laser device comprising:

a discharge tube;

a cavity formed of an output mirror at a front side and a total reflection mirror at a rear side;

an etalon positioned between the front and rear mirrors;

at least a beam splitter for causing a laser beam sprite;

a spectroscope for measuring a center wavelength of the split laser beam;

a first driver for adjusting a laser beam transmission angle of the etalon, a second driver for adjusting an attitude angle of the total reflection mirror and the etalon without changing a relative position between the total reflection mirror and the etalon; and a controller for controlling both the first driver in accordance with variations in a main lobe of the spectrum wavelength measured by the spectroscope and the second driver in accordance with a ratio in intensity of a side lobe to the main lobe of the spectrum wavelength measured by the spectroscope and variations in the direction of the laser emission measured by the spectroscope.

13. The laser device as claimed in claim 12, wherein the output mirror, the total reflection mirror, the beam spritter and the etalon are securely fixed on a supporting structure which is mounted via a vibration removing device over a mount on which the discharge tube is mounted so that the output mirror, the total reflection mirror and the wavelength selective element are free from any vibration of the discharge tube.

* * * * *